United States Patent
Song

(10) Patent No.: US 8,059,347 B2
(45) Date of Patent: Nov. 15, 2011

(54) POSITIONING ASSEMBLY AND OPTICAL SYSTEM UTILIZING THE SAME

(75) Inventor: Shang-Xuan Song, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 6 days.

(21) Appl. No.: 12/646,855

(22) Filed: Dec. 23, 2009

(65) Prior Publication Data

US 2011/0102919 A1    May 5, 2011

(30) Foreign Application Priority Data

Oct. 30, 2009  (CN) .......................... 2009 1 0309181

(51) Int. Cl.
*G02B 7/02* (2006.01)

(52) U.S. Cl. ..................................... 359/829

(58) Field of Classification Search .................. 359/819, 359/822–824, 829; 369/44.14, 44.15; 353/100, 353/101; 355/53, 72
See application file for complete search history.

(56) References Cited

U.S. PATENT DOCUMENTS

| 5,764,312 A * | 6/1998 | Okumura ....................... 348/785 |
| 7,527,385 B2 * | 5/2009 | Lin ................................ 353/101 |

* cited by examiner

*Primary Examiner* — Ricky Mack
*Assistant Examiner* — Tuyen Tra
(74) *Attorney, Agent, or Firm* — Altis Law Group, Inc.

(57) ABSTRACT

A positioning assembly includes a fixing plate, a positioning plate, a connecting sleeve, one or more first adjusting member, and one or more second adjusting members. The connecting sleeve is positioned between the fixing plate and the positioning plate. The positioning sleeve is sleeved on the connecting sleeve, and fixed to the positioning plate. The first adjusting member is movably disposed on the positioning sleeve, and resists the connecting sleeve, to adjust a position of the connecting sleeve relative to the positioning sleeve. The second adjusting members are disposed between the fixing plate and the positioning plate, to adjust a gradient of the positioning plate relative to the fixing plate. An optical system using the positioning assembly is also provided.

19 Claims, 5 Drawing Sheets

POSITIONING ASSEMBLY AND OPTICAL SYSTEM UTILIZING THE SAME

BACKGROUND

1. Technical Field

The present disclosure relates generally to optical systems and, more particularly, to a positioning assembly and an optical system employing the positioning assembly.

2. Description of Related Art

Lasers are widely used in cutting technologies. The laser is generally focused by a group of lenses to achieve a required precision. An expander lens is configured for changing the radius and divergence angle of the laser beam. Following beam expanding and collimation by the expander lens, the laser beam is passed through and is focused by a focus lens, resulting in a smaller high-power incidence on a workpiece.

To ensure proper alignment with the laser beam, the expander lens is generally positioned in a laser cutting machine by a conventional fixing assembly. However, the expander lens on the fixing assembly can only accept planar (2-axis) adjustments, making the alignment more difficult.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
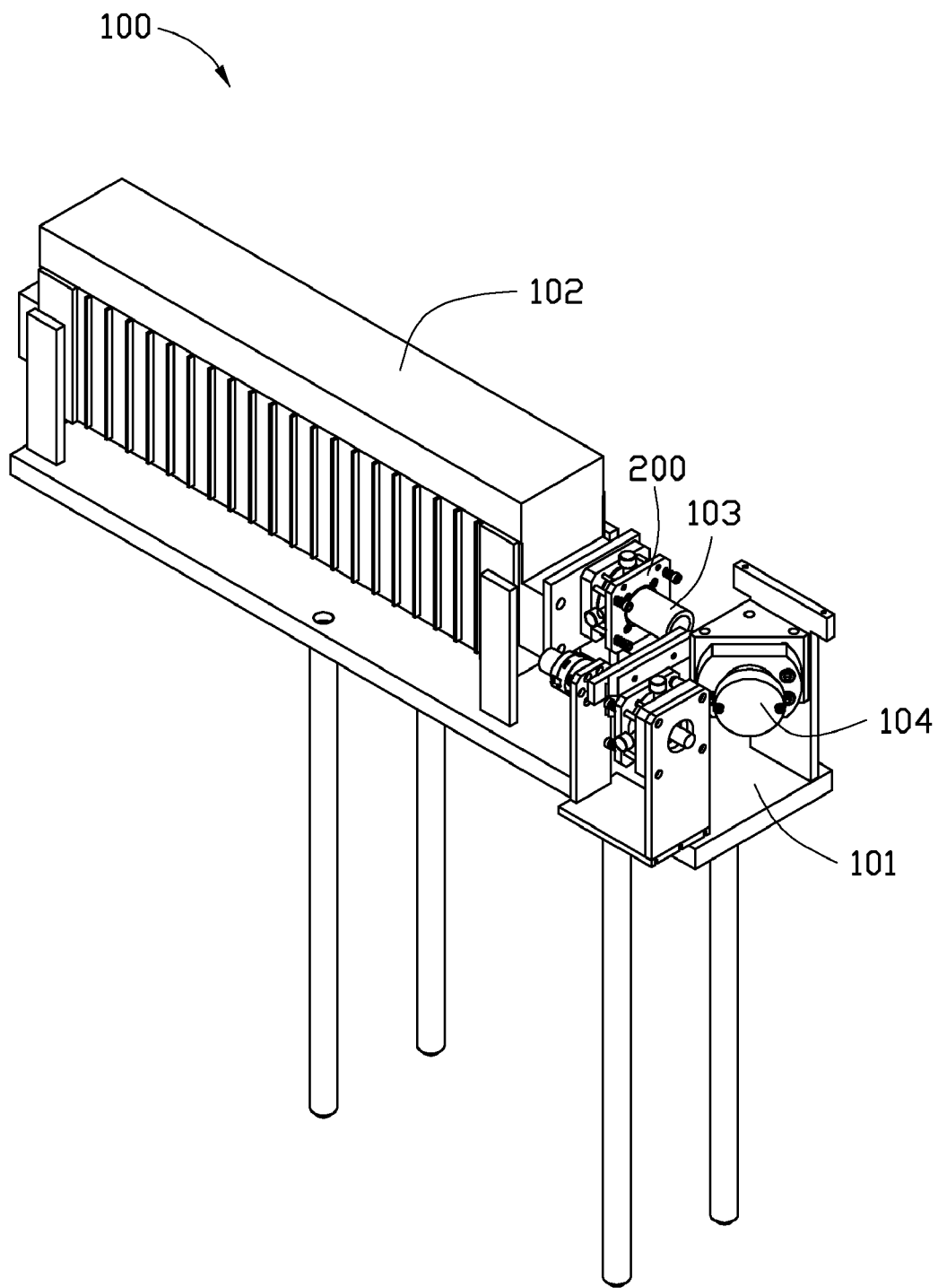
FIG. 1 is an isometric view of an embodiment of an optical system employing a positioning assembly.

Referring to FIG. 1, an optical system 100 includes a base 101, a laser source 102, an expander lens 103, a focus lens 104 and a positioning assembly 200. The laser source 102, the expander lens 103, and the focus lens 104 are arranged or positioned on the base 101. A laser beam emitted from the laser source 102 is expanded by the expander lens 103, and focused by the focus lens 104 to form a smaller high-power incidence. The expander lens 103 is assembled on the positioning assembly 200, and the relative position of the expander lens 103 with respect to the laser source 102 can be changed in three-axis (and adjusting the expander lens 103 planar positioning and three-axis rotational angle) by adjusting the positioning assembly 200, to enable the expander lens 103 to align or coincide with the laser source 102.

Figure 2:
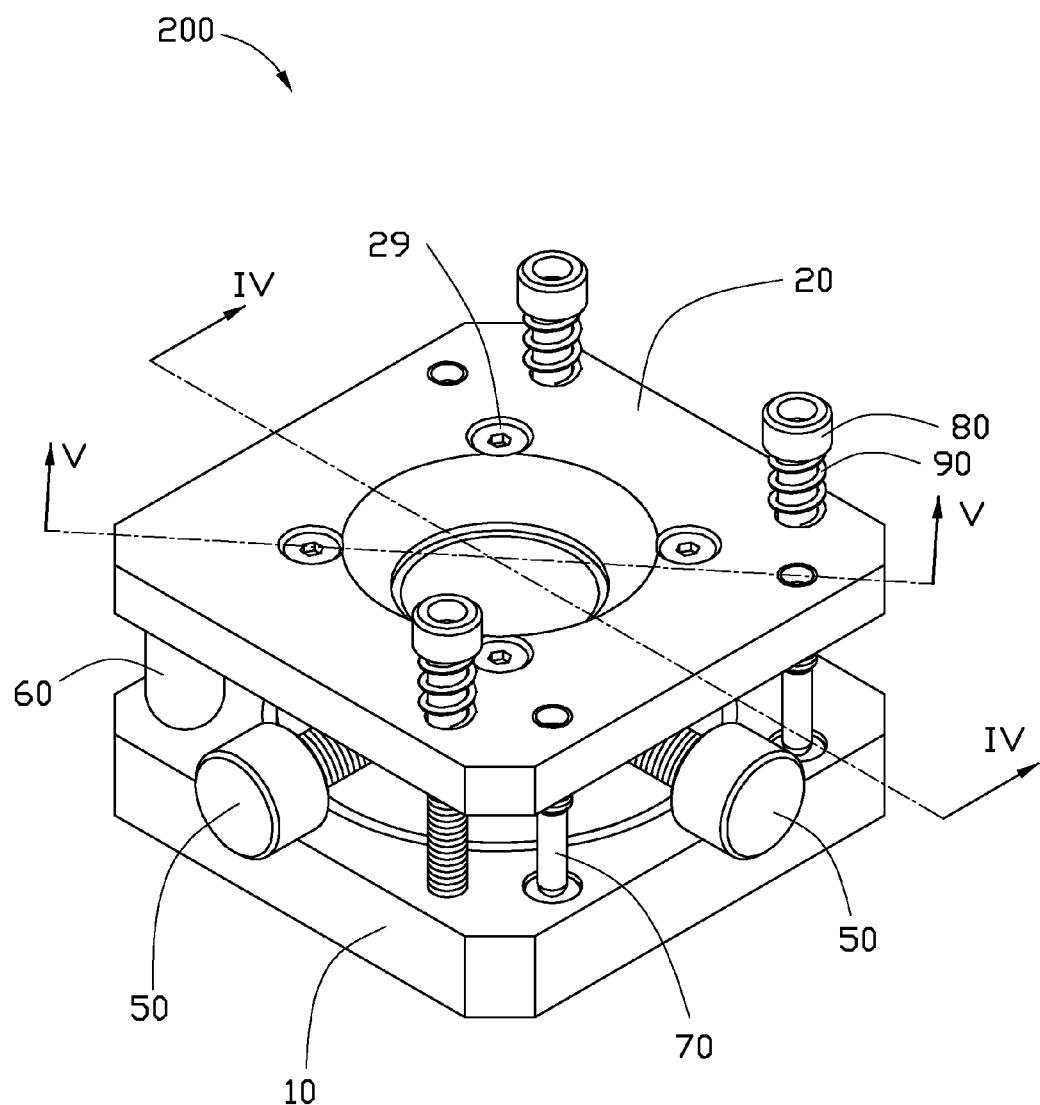
FIG. 2 is an isometric view of an embodiment of a positioning assembly, employed in an optical system, such as, for example, that of FIG. 1.
Figure 3:
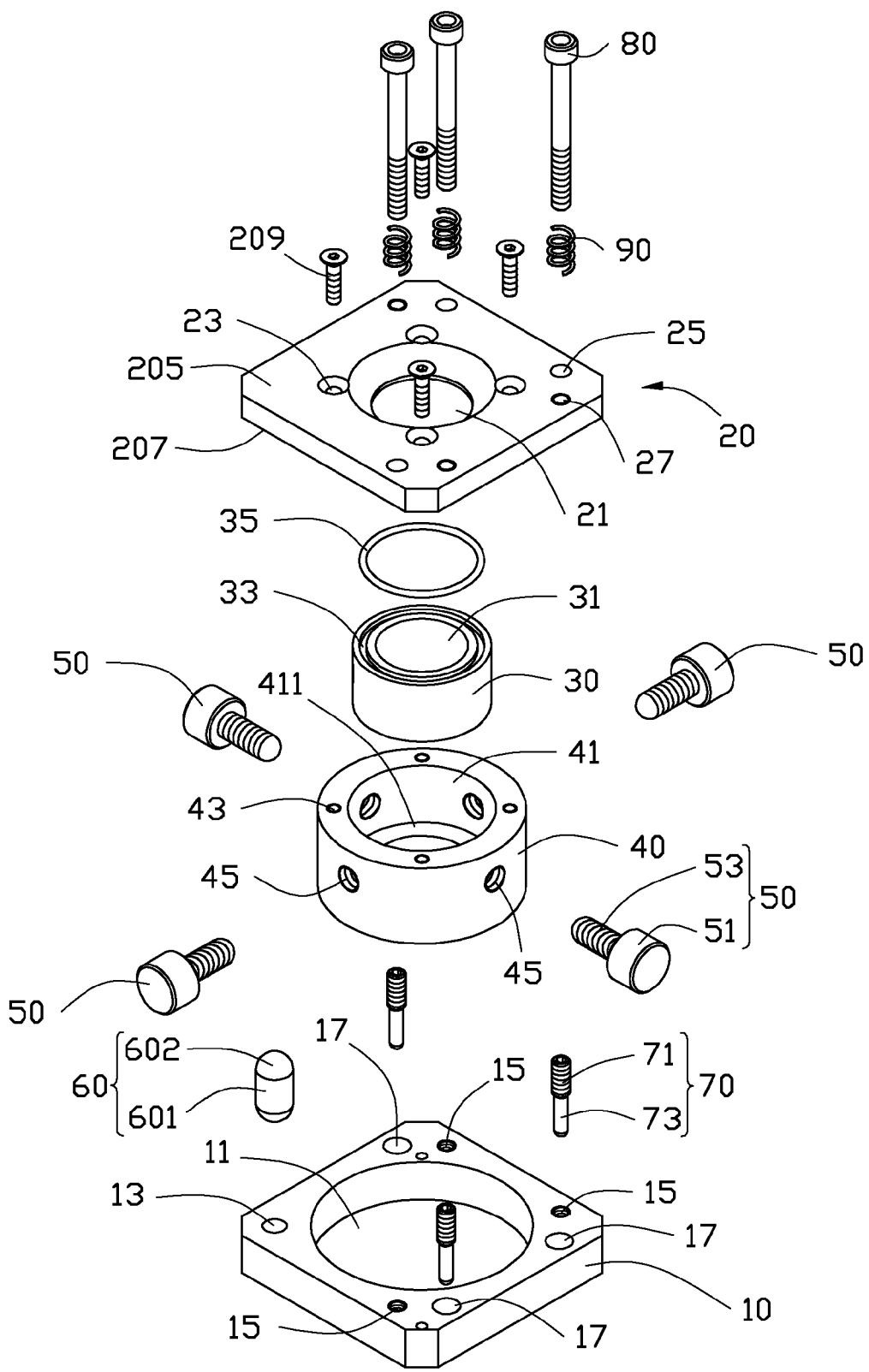
FIG. 3 is an exploded, isometric view of the positioning assembly of FIG. 2.

Referring to FIGS. 2 and 3, a positioning assembly 200 includes a fixing plate 10, a positioning plate 20, a connecting sleeve 30, a positioning sleeve 40, a plurality of first adjusting members 50, a support member 60, a plurality of second adjusting members 70, a plurality of first fasteners 80, a plurality of elastic members 90, and a plurality of second fasteners 209. In the illustrated embodiment, the positioning assembly 200 includes four first adjusting members 50, three second adjusting members 70, three first fasteners 80, three elastic members 90, and four second fasteners 209. Both the first fasteners 80 and the second fasteners 90 can be screws.

The fixing plate 10 is substantially rectangular, and can be connected to the laser source 102 via fasteners (not shown). A center of the fixing plate 10 defines a circular assembly hole 11. The fixing plate 10 defines a part-spherical groove 13 (see FIG. 5) in a corner, and defines three assembly grooves 17 in the other three corners. The fixing plate 10 further defines three first threaded holes 15. Each threaded hole 15 is adjacent to one corresponding assembly groove 17.

The positioning plate 20 is substantially rectangular. A center of the positioning plate 20 defines a positioning hole 21 for receiving the expander lens 103. A radius of the positioning hole 21 gradually reduces from a first surface 205 to a second surface 207. The positioning plate 20 defines four through holes 23 arranged in a periphery of the positioning hole 21. The positioning plate 20 further defines three assembly holes 25 and three second threaded holes 27 in three corners, and a part-spherical groove 29 (see FIG. 5) in the second surface 207.

The connecting sleeve 30 defines a pivot hole 31 in the center, and a receiving groove 33 in a top surface. A seal ring 35 is configured for positioning in the receiving groove 33. The seal ring 35 can an O-ring. In the illustrated embodiment, the connecting sleeve 30 is made of aluminum, such that the connecting sleeve 30 is easily moved.

The positioning sleeve 40 defines a positioning hole 41 for slidably receiving the connecting sleeve 30. A restricting portion 411 is formed on an end of the positioning sleeve 40 to resist the connecting sleeve 30. The positioning sleeve 40 defines four third threaded holes 43 surrounding the positioning hole 41. The positioning sleeve 40 further defines four fourth threaded holes 45 in the cylindrical surface, which communicate with the positioning hole 41. In the illustrated embodiment, two fourth threaded holes 45 are aligned in a first straight line, another two fourth threaded holes 45 are aligned in a second straight line perpendicular to the first straight line.

Each first adjusting members 50 includes a cylindrical rotating portion 51 and a resisting portion 53 extending from an end of the rotating portion 51. In the illustrated embodiment, the resisting portion 53 is threaded.

The support member 60 includes a main body 601 and two resisting portions 602 formed on opposite sides of the main body 601. In the illustrated embodiment, the main body 601 is substantially cylindrical, and the resisting portions 602 substantially part-spherical or hemispherical.

Each second adjusting member 70 includes a threaded portion 71 and a resisting portion 73 extending from an end of the threaded portion 71.

Figure 4:
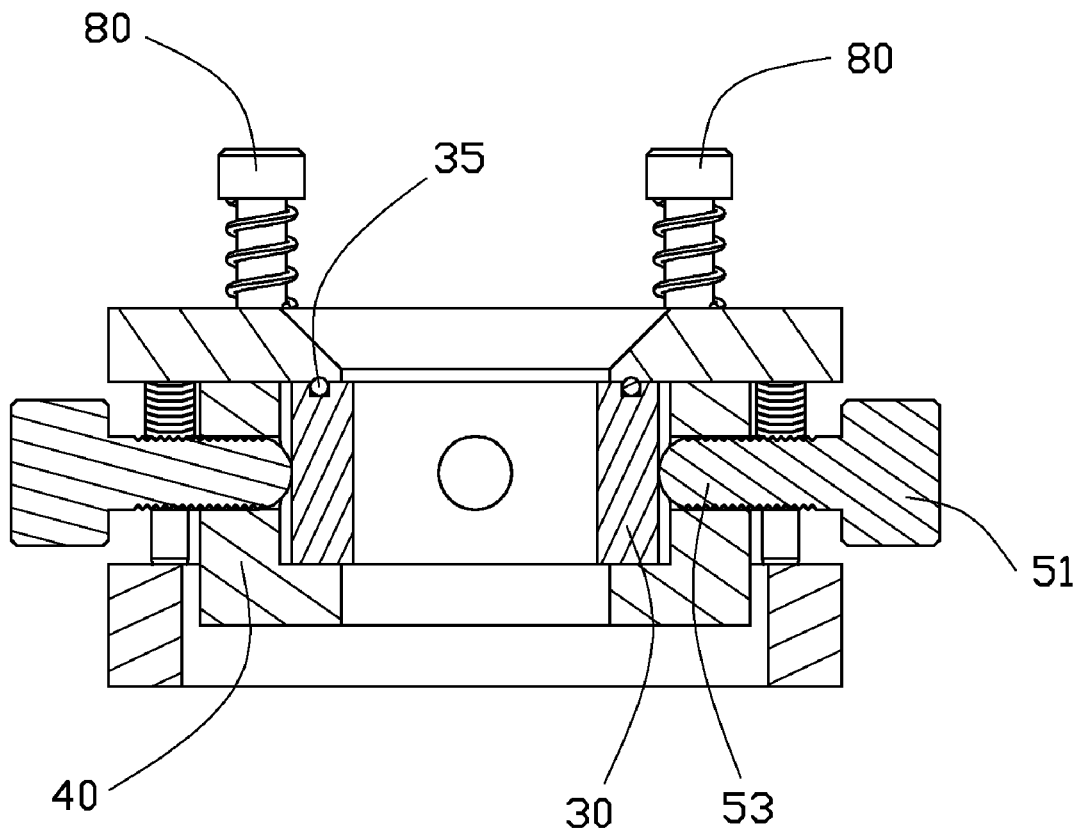
FIG. 4 is a cross-section of the optical system of FIG. 2 taken along line IV-IV.
Figure 5:
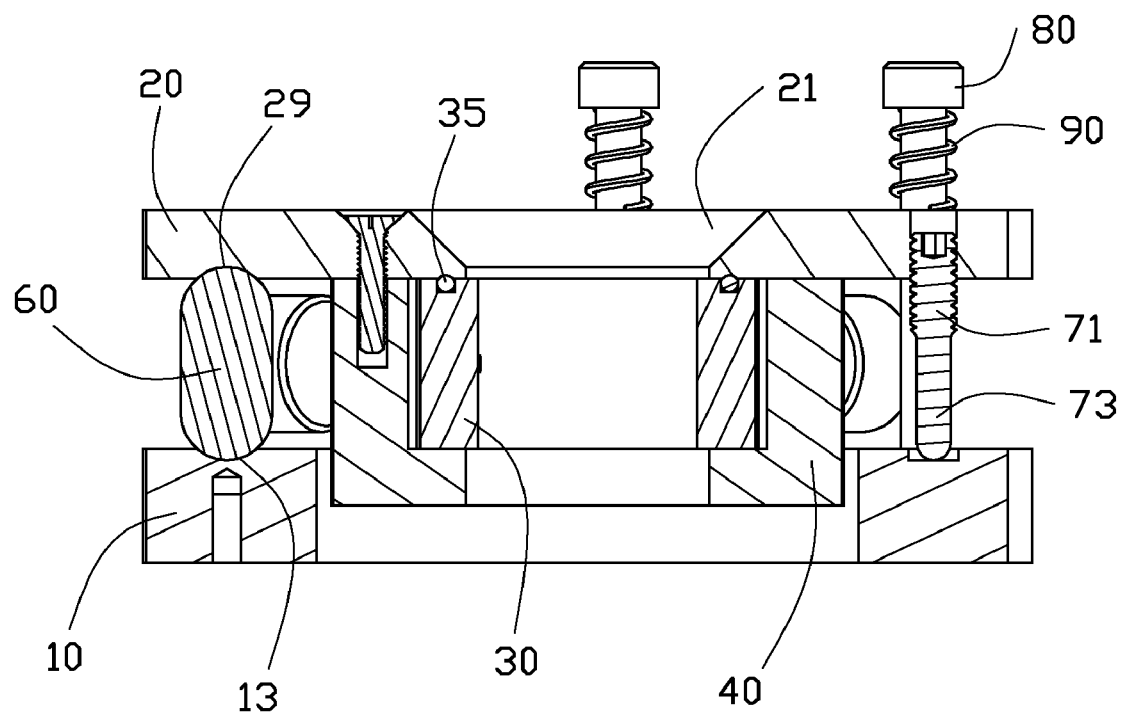
FIG. 5 is a cross-section of the optical system of FIG. 2 taken along line V-V.

Referring to FIGS. 3 through 5, during assembly of the positioning assembly 200, the connecting sleeve 30 is received in the positioning hole 41 of the positioning sleeve 40, until the connecting sleeve 30 resists the restricting portion 411. The first adjusting members 50 extend through the fourth threaded holes 45 and resist the connecting sleeve 30. The first adjusting member 50 is fixed accordingly in the positioning sleeve 40. The seal ring 35 is positioned in the receiving groove 33 of the connecting sleeve 30. The second fasteners 209 extend through the through holes 23 of the positioning plate 20, and are threaded in the third threaded holes 43, thus fixing the positioning plate 20 to the connecting sleeve 30. The threaded portions 71 of the second adjusting members 70 are threaded in the second threaded holes 27 of the positioning plate 20, and the resisting portions 73 are received in the assembly grooves 17 of the fixing plate 10.

One hemispherical portion 602 of the support member 60 is partially received in the part-spherical groove 13 of the fixing plate 10, and the other hemispherical portion 602 of the support member 60 is partially received in the part-spherical groove 29 of the positioning plate 20. The first fasteners 80 extend through the elastic members 90, the assembly holes 25 of the positioning plate 20, and are received in the threaded holes 15 of the fixing plate 10.

The positioning assembly 200 is attached to the laser source 102 via the fixing plate 10. The expander lens 103 is assembled in the connecting sleeve 30 of the positioning assembly 200. In use, if the laser beam emitted from the laser source 102 is not aligned coincide with an axis of the expander lens 103, but parallel thereto, the first adjusting members 50 are adjusted to move the expander lens 103 in parallel until the axis of the expander lens 103 and the laser beam are coincide. If the laser beam intersects the axis of the expander lens 103, the second adjusting members 70 are adjusted to change a gradient of the positioning plate 20 relative to the fixing plate 10, until the axis of the expander lens 103 and the laser beam coincide. If the laser beam is not parallel and intersects the axis of the expander lens 103, the first adjusting members 50 and the second adjusting members 70 are adjusted, such that the axis of the expander lens 103 and the laser beam align and coincide. Since the support member 60 receives the hemispherical portion 602 in the part-spherical groove 29 of the positioning plate 20, the positioning plate 20 easily rotates relative to the fixing plate 10.

It should be pointed out that the first adjusting members 50 and the second adjusting members 70 can be driven by servo motor, for providing automatic focusing. The positioning assembly 200 may include one or two first adjusting members 50, and an elastic member positioned between the connecting sleeve 30 and the positioning sleeve 40. In addition, the second adjusting members 70 can include other components for changing a gradient of the positioning plate 20 relative to the fixing plate 10, such as cylinders.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A positioning assembly, comprising:
a fixing plate;
a positioning plate;
a connecting sleeve positioned between the fixing plate and the positioning plate;
a positioning sleeve sleeved on the connecting sleeve, and fixed to the positioning plate;
at least one first adjusting member movably disposed on the positioning sleeve, and resisting the connecting sleeve, to adjust a position of the connecting sleeve relative to the positioning sleeve; and
a plurality of second adjusting members disposed between the fixing plate and the positioning plate, to adjust a gradient of the positioning plate relative to the fixing plate, wherein each of the second adjusting members comprises a threaded portion and a resisting portion extending from an end of the threaded portion, the threaded portion engages with the positioning plate, and the resisting portion resists the fixing plate.

2. The positioning assembly of claim 1, further comprising a support member disposed between the fixing plate and the positioning plate.

3. The positioning assembly of claim 2, wherein the support member comprises a main body and two resisting portions on opposite sides of the main body, the fixing plate defines a part-spherical groove receiving one resisting portion, and the positioning plate defines a part-spherical groove receiving the other resisting portion.

4. The positioning assembly of claim 3, wherein the resisting portions are hemispherical, and partially received in the part-spherical groove of the positioning plate and the part-spherical groove of the fixing plate.

5. The positioning assembly of claim 1, wherein the positioning sleeve defines at least one threaded hole, and each of the at least one first adjusting members comprises a resisting portion received in the at least one threaded hole.

6. The positioning assembly of claim 5, wherein four first adjusting members are substantially symmetrically arranged on the positioning sleeve.

7. The positioning assembly of claim 1, further comprising a plurality of fasteners and a plurality of elastic members, the elastic members sleeved on the fasteners, and the fasteners connecting the fixing plate to the positioning plate.

8. The positioning assembly of claim 1, wherein the connecting sleeve defines a receiving groove at an end adjacent to the positioning plate; and the positioning assembly further comprises a seal ring positioned in the receiving groove.

9. The positioning assembly of claim 1, wherein the connecting sleeve is made of aluminum.

10. An optical system, comprising:
a base;
a laser source positioned on the base;
a expander lens and a focus lens positioned on the base, the expander lens disposed between the laser source and the focus lens; and
a positioning assembly for positioning the expander lens with the laser source, comprising:
a fixing plate fixed to the laser source;
a positioning plate;
a connecting sleeve receiving the expander lens between the fixing plate and the positioning plate;
a positioning sleeve sleeved on the connecting sleeve, and fixed to the positioning plate;
at least one first adjusting member movably disposed on the positioning sleeve and resisting the connecting sleeve, adjusting a position of the connecting sleeve relative to the positioning sleeve; and
a plurality of second adjusting members disposed between the fixing plate and the positioning plate, adjusting a gradient of the positioning plate relative to the fixing plate.

11. The optical system of claim 10, wherein the positioning assembly further comprises a support member disposed between the fixing plate and the positioning plate.

12. The optical system of claim 11, wherein the support member comprises a main body and two resisting portions on opposite sides of the main body, and the fixing plate defines a part-spherical groove for receiving one resisting portion and the positioning plate defines a part-spherical groove for the other resisting portion.

13. The optical system of claim 12, wherein the resisting portions are hemispherical, and partially received in the part-spherical groove of the positioning plate and the part-spherical groove of the fixing plate.

14. The optical system of claim 10, wherein each of the second adjusting members comprises a threaded portion and a resisting portion extending from an end of the threaded portion, wherein the threaded portion engages the positioning plate and the resisting portion resists the fixing plate.

15. The optical system of claim 10, wherein the positioning sleeve defines at least one threaded hole, and each first adjusting member comprises a resisting portion received in the at least one threaded hole.

16. The optical system of claim 15, wherein four first adjusting members are substantially symmetrically arranged on the positioning sleeve.

17. The optical system of claim 10, wherein the positioning assembly further comprises a plurality of fasteners and a plurality of elastic members, the elastic members sleeved on the fasteners and the fasteners connecting the fixing plate to the positioning plate.

18. The optical system of claim 10, wherein the positioning sleeve defines a receiving groove at an end adjacent to the positioning plate; and the positioning assembly further comprises a seal ring positioned in the receiving groove.

19. The optical system of claim 10, wherein the connecting sleeve is made of aluminum.

* * * * *